UNITED STATES PATENT OFFICE.

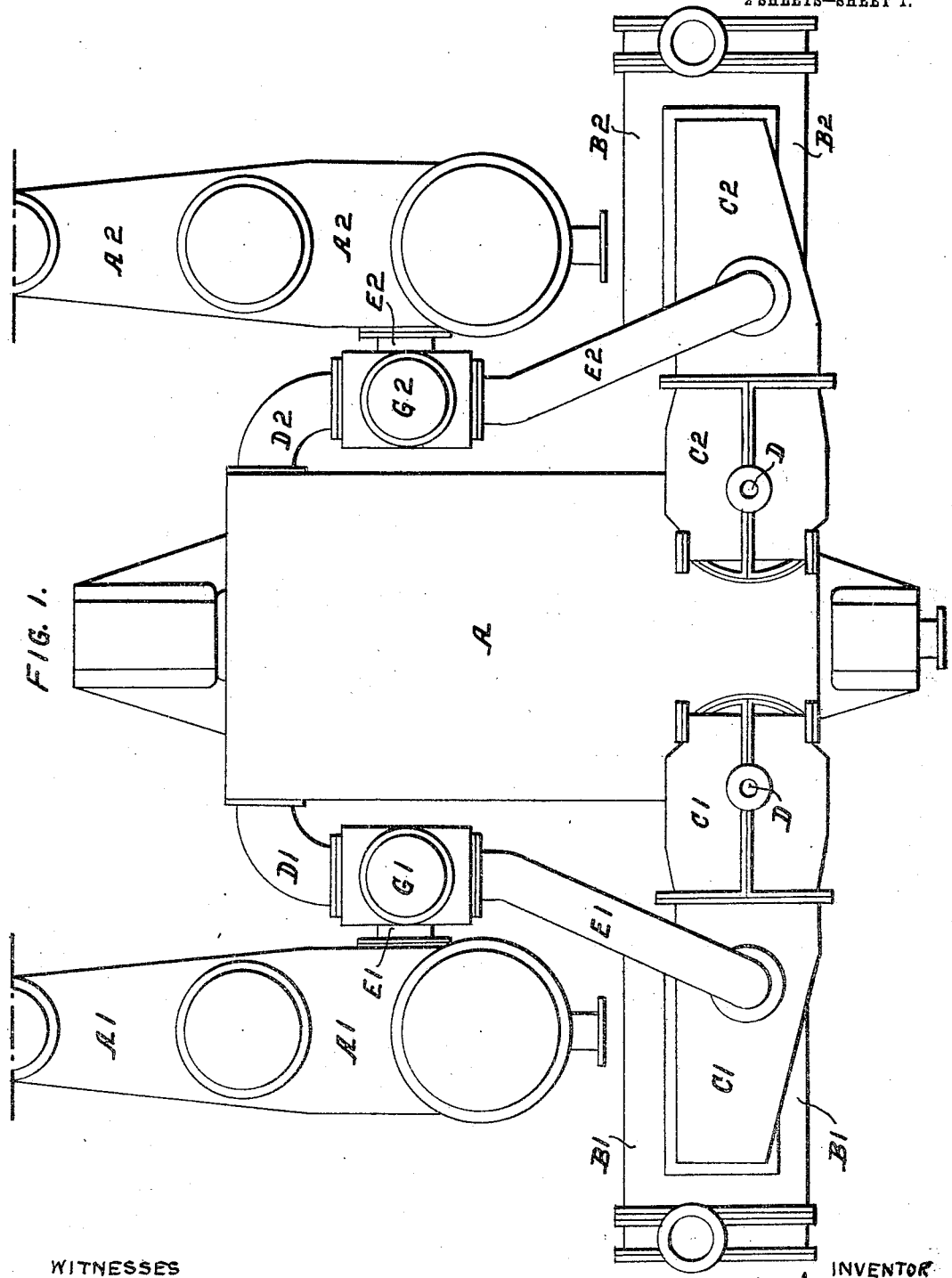

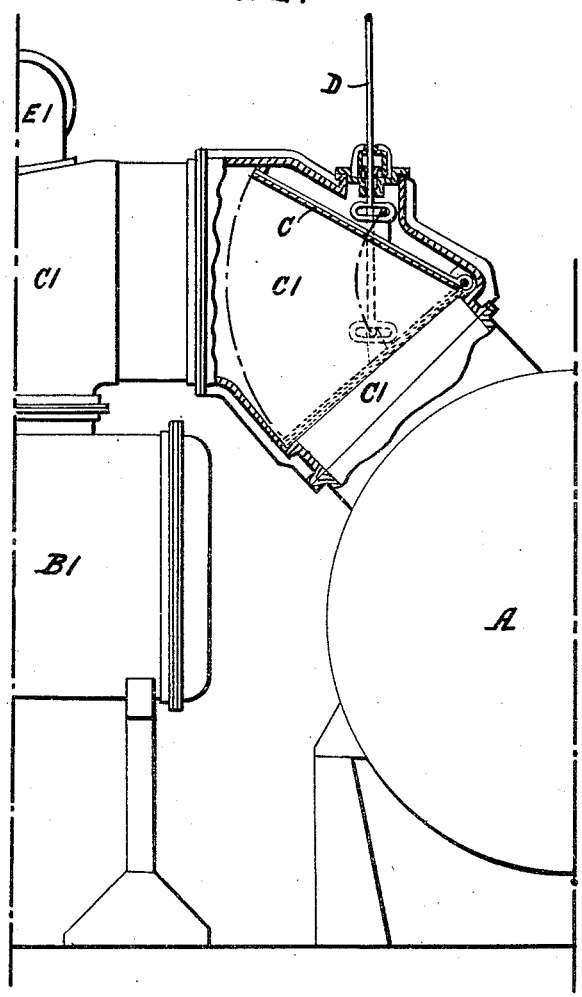

JOHN IRVING, OF CARDROSS, SCOTLAND.

COMBINED RECIPROCATING AND TURBINE ENGINE INSTALLATION.

956,357.  Specification of Letters Patent.  Patented Apr. 26, 1910.

Application filed October 12, 1909. Serial No. 522,245.

*To all whom it may concern:*

Be it known that I, JOHN IRVING, a subject of the King of Great Britain and Ireland, and a resident of Cardross, in the county of Dumbarton, Scotland, have invented certain new and useful Improvements in Connection with Combined Reciprocating and Turbine Engine Installations, and of which the following is the specification.

In combined reciprocating-and-turbine-engine installations for general or marine purposes, the turbine engine is arranged between two reciprocating engines having separate condensers into which the turbine engine exhausts through separate exhaust pipes on each side. In such arrangements, should a defect arise in one of the condensers or in its air or circulating pump or other connection, the three propelling engines have to be stopped to enable the repair to be effected. This results in great loss of time, and at sea may involve the ship in serious difficulty.

This invention has for its object to overcome these disabilities and render it possible to repair a condenser or its air or circulating pump or other connection without its being necessary to stop any of the three propelling engines.

In carrying out the invention, a closure device consisting of a stop valve is arranged in each of the exhaust pipes or passages between the turbine engine and the condensers, and should a condenser or its air or circulating pump or other connection on one side require repair, the stop valve in the exhaust pipe connected with that condenser is closed, thereby shutting off connection between the turbine engine and the defective condenser, so that the necessary repair can then be effected conveniently, the propelling engines, of course, then exhausting entirely into the other condenser.

In order that the invention and the manner of performing the same may be properly understood there are hereunto appended two sheets of drawings throughout which like reference symbols indicate like parts, and in which—

Figure 1 (Sheet 1) is a plan showing diagrammatically the combined reciprocating- and turbine-engine installation, while Fig. 2 (Sheet 2) is a sectional end elevation drawn to a larger scale, and showing an example of the means provided, according to this invention, for shutting off connection between the turbine engine and the condensers.

As shown in the drawings a turbine engine A is arranged between two reciprocating engines $A^1$, $A^2$, having separate condensers $B^1$ $B^2$ into which the turbine engine A exhausts through separate exhaust pipes $C^1$ $C^2$. The steam passes from the reciprocating engines $A^1$, $A^2$ to the turbine engine A by the usual branch pipes $D^1$ $D^2$ and there are also provided the usual branch connections $E^1$, $E^2$ leading from the reciprocating engines direct to the condensers, these branches being fitted with valves $G^1$ $G^2$ as usual, so that the turbine may be cut out altogether when the reciprocating engines $A^1$ $A^2$ are going astern, for example.

In carrying out the invention, a closure device consisting of a stop valve C (Fig. 2) is arranged in each of the exhaust pipes or passages $C^1$, $C^2$ between the turbine engines A and the condensers $B^1$, $B^2$ and should a condenser or its air or circulating pump or other connection on one side require repair, the stop valve C in the exhaust pipe connected with that condenser is closed, thereby shutting off connection between the turbine engine A and the defective condenser, so that the necessary repair can then be effected conveniently, the exhaust steam, of course, then passing entirely into the other condenser.

The stop valves C employed are, as shown, preferably of the clack valve type. They are arranged to work across the pipes $C^1$ $C^2$ and are centrally attached, each to a vertical spindle D connected at the outside to any suitable mechanism (not shown) for opening and closing the valve. Any other suitable type of stop valve, however, may be employed.

What I claim is:—

In a valve mechanism for the purpose described, a clack valve arranged in the passage controlled, a bracket thereon and a pin carried thereby, in combination with an operating stem for said valve provided with a slotted end engaging said pin and a stuffing box through which said stem extends, substantially as described.

In testimony whereof I have signed my name to this specification, in the presence of two subscribing witnesses.

JOHN IRVING.

Witnesses:
 WILFRED HENY,
 BARBARA MILLER.